(12) United States Patent
Paik et al.

(10) Patent No.: US 12,141,944 B1
(45) Date of Patent: Nov. 12, 2024

(54) HIGH DYNAMIC RANGE IMAGING METHOD AND APPARATUS

(71) Applicant: CHUNG ANG UNIVERSITY INDUSTRY ACADEMIC COOPERATION FOUNDATION, Seoul (KR)

(72) Inventors: Joon Ki Paik, Seoul (KR); Heun Seung Lim, Seoul (KR); Joong Chol Shin, Seoul (KR); Jin Sol Choi, Seoul (KR)

(73) Assignee: CHUNG ANG UNIVERSITY INDUSTRY ACADEMIC COOPERATION FOUNDATION, Seoul (KR)

( * ) Notice: Subject to any disclaimer, the term of this patent is extended or adjusted under 35 U.S.C. 154(b) by 0 days.

(21) Appl. No.: 18/661,695

(22) Filed: May 12, 2024

Related U.S. Application Data

(63) Continuation of application No. PCT/KR2023/021685, filed on Dec. 27, 2023.

(30) Foreign Application Priority Data

May 22, 2023 (KR) ........................ 10-2023-0065517

(51) Int. Cl.
*G06T 5/60* (2024.01)
*G06T 5/10* (2006.01)
(Continued)

(52) U.S. Cl.
CPC ................ *G06T 5/60* (2024.01); *G06T 5/10* (2013.01); *G06T 5/50* (2013.01);
(Continued)

(58) Field of Classification Search
CPC .... G06T 5/60; G06T 5/10; G06T 5/50; G06T 2207/20048; G06T 2207/20084;
(Continued)

(56) References Cited

U.S. PATENT DOCUMENTS

2020/0134787 A1\* 4/2020 Bouzaraa .................. G06T 5/73
2021/0342986 A1\* 11/2021 Chen ....................... G06N 20/00

FOREIGN PATENT DOCUMENTS

| CN | 115908805 | \* | 4/2023 | ............. G06N 3/455 |
| CN | 115908805 A | | 4/2023 | |

(Continued)

OTHER PUBLICATIONS

International Search Report for PCT/KR2023/021685 dated May 22, 2023.

(Continued)

*Primary Examiner* — Amara Abdi (57) ABSTRACT

Disclosed are a high dynamic range imaging method and apparatus. The high dynamic range imaging method includes: (a) acquiring a first low dynamic range (LDR) image, a second LDR image, and a third LDR image having different exposure values; (b) applying the first, second, and third LDR images to a weight map estimation model to extract a weight map, and integrating the first, second, and third LDR images using the extracted weight map to generate an input feature map; and (c) applying the input feature map to a Swin-Fourier convolution network model to perform Fourier transform and convolution on the input feature map, and then connecting a reference feature map to generate a high dynamic range (HDR) image.

6 Claims, 9 Drawing Sheets

(51) Int. Cl.
  *G06T 5/50* (2006.01)
  *H04N 23/80* (2023.01)
(52) U.S. Cl.
  CPC .............. *G06T 2207/20048* (2013.01); *G06T 2207/20084* (2013.01); *G06T 2207/20208* (2013.01); *G06T 2207/20212* (2013.01); *H04N 23/80* (2023.01)
(58) Field of Classification Search
  CPC ........... G06T 2207/20208; G06T 2207/20212; H04N 23/80
  See application file for complete search history.

(56) References Cited

FOREIGN PATENT DOCUMENTS

| KR | 10-2019-0067113 A | | 6/2018 | |
| --- | --- | --- | --- | --- |
| KR | 20190067113 | * | 6/2019 | .............. G06N 3/84 |
| KR | 10-2021-0127591 A | | 10/2021 | |
| KR | 20210127591 | * | 10/2021 | .............. G06N 3/08 |

OTHER PUBLICATIONS

Written Opinion for PCT/KR2023/021685 dated Apr. 2, 2024.
Notice of Preliminary Examination Results from Korean Intellectual Property Office dated May 22, 2023 for KR Patent Application No. 10-2023-0065517.
Notice of Decision To Grant a Patent from Korean Intellectual Property Office dated Jan. 8, 2024 for KR Patent Application No. 10-2023-0065517.
Notice To Submit a Response from Korean Intellectual Property Office dated Dec. 21, 2023 for KR Patent Application No. 10-2023-0065517.
Kai Zhang et al., 'Practical Blind Denoising via Swin-Conv-UNet and Data Synthesis', Computer Vision Lab, ETH Zurich, Switzerland, arxiv.org, arXiv:2203.13278v1, pp. 1-12, Mar. 2022 p. 3; and figure 1.

* cited by examiner

HIGH DYNAMIC RANGE IMAGING METHOD AND APPARATUS

CROSS-REFERENCE TO RELATED APPLICATION

This application is a continuation of pending PCT International Application No. PCT/KR2023/021685, which was filed on Dec. 27, 2023, and which claims priority to Korean Patent Application No. 10-2023-0065517 which was filed in the Korean Intellectual Property Office on May 22, 2023. The disclosures of which are hereby incorporated by reference in their entireties.

TECHNICAL FIELD

The present invention relates to a high dynamic range imaging method and apparatus.

BACKGROUND ART

A dynamic range of digital images refers to a range of measurement values that may be represented by physical sensors within an imaging system. However, when an exposure time is insufficient or excessive, the acquired image has a low dynamic range (LDR) due to functional limitations of the physical sensors, and the subjective image quality deteriorates. To solve these problems, researches on several high dynamic range imaging methods have been conducted.

The conventional imaging system has several HDR functions built therein. A motion detection-based method uses a weight map, a threshold bitmap, and similar techniques to synthesize HDR images from LDR images having multiple exposure values for motion occurring within an image.

An alignment-based method extends a dynamic range by aligning LDR images using a method such as warping around an exposure value image.

However, although the conventional technologies have succeeded in acquiring the HDR images, they still have problems such as movement and color distortion that occur in the LDR images.

DISCLOSURE

Technical Problem

It is an object of the present invention to provide a high dynamic range imaging method and apparatus.

It is another object of the present invention to provide a high dynamic range imaging method and apparatus capable of minimizing color distortion that occurs when converting an LDR image into an HDR image, preserving texture, and reducing ghosting.

Technical Solution

According to an aspect of the present invention, a high dynamic range imaging method is disclosed.

According to an embodiment of the present invention, the high dynamic range imaging method may include: (a) acquiring a first low dynamic range (LDR) image, a second LDR image, and a third LDR image having different exposure values; (b) applying the first, second, and third LDR images to a weight map estimation model to extract a weight map, and integrating the first, second, and third LDR images using the extracted weight map to generate an input feature map; and (c) applying the input feature map to a Swin-Fourier convolution network model to perform Fourier transform and convolution on the input feature map, and then connecting a reference feature map to generate a high dynamic range (HDR) image.

The reference feature map may be a feature map of the second LDR image extracted by the weight map estimation model.

The step (b) may include: applying the first, second, and third LDR images to a convolution layer of the weight map estimation model to extract a first feature map, a second feature map, and a third feature map, respectively; applying the first feature map and the second feature map to a first attention module of the weight map estimation model to generate a first weight map, and applying the third feature map and the second feature map to a second attention module of the weight map estimation model to generate a second weight map; and generating the input feature map by reflecting the first weight map and the second weight map in the first feature map and the third feature map, respectively, and then combining the first weight map and the second weight map with the second feature map.

The Swin-Fourier convolution network model may be composed of a plurality of Swin-Fourier convolution blocks and a transpose convolution block, and the Swin-Fourier convolution block may include: a Swin-transformer block that configures a hierarchical feature map by dividing the input feature map into patch units; a residual block that adds a global residual to a feature map of a reference image using a skip connection; and a connection unit that has a first 3×3 convolution layer and a second 3×3 convolution layer connected to a rear end of the Swin-transformer block, synthesizes output values of the first 3×3 convolution layer and the second 3×3 convolution layer for each element to output a first sub-synthesis result, synthesizes output values of a third 3×3 convolution layer connected to a rear end of the residual block and the residual block with an output value of a spectral transform module that is Fourier transformed for each element to output a second sub-synthesis result value, and connects the first sub-synthesis result value and the second sub-synthesis result value. A loss function of the Swin-Fourier convolution network model may be calculated as follows:

$$L_{total} = L_{EPL} + l_1.$$

wherein, $$L_{EPL} = \frac{1}{N} \sum \exp^{\gamma \| log|VGG19(T(x))| - log|VGG19(T(y))| \|},$$

x denotes a target HDR image, y denotes the generated HDR image, $\exp^{-\gamma \|\cdot\|}$ denotes a Gaussian kernel that generalizes a Euclidean distance to a manifold using a geodesic distance, T(·) denotes a tone mapping operator and is calculated as $$T(M) = \frac{\log(1 + \mu M)}{\log(1 + M)},$$

μ denotes a compression parameter, $l_1$ denotes an MAE loss, and VGG19( ) denotes a convolution neural network.

According to another aspect of the present invention, an HDR image apparatus is provided.

According to another embodiment of the present invention, the high dynamic range imaging apparatus may include: an image acquisition unit configured to acquire a first low dynamic range (LDR) image, a second LDR image, and a third LDR image having different exposure values; a weight map estimation unit configured to apply the first, second, and third LDR images to a weight map estimation model to extract a weight map, and integrate the first, second, and third LDR images using the extracted weight map to generate an input feature map; and an HDR generation unit configured to apply the input feature map to a Swin-Fourier convolution network model to perform Fourier transform and convolution on the input feature map, and then connect a reference feature map to generate a high dynamic range (HDR) image.

The weight map estimation unit may apply the first, second, and third LDR images to a convolution layer of the weight map estimation model to extract a first feature map, a second feature map, and a third feature map, respectively, apply the first feature map and the second feature map to a first attention module of the weight map estimation model to generate a first weight map, and apply the third feature map and the second feature map to a second attention module of the weight map estimation model to generate a second weight map, and generate the input feature map by reflecting the first weight map and the second weight map in the first feature map and the third feature map, respectively, and then combining the first weight map and the second weight map with the second feature map.

Advantageous Effects

By providing a high dynamic range imaging method and apparatus according to an embodiment of the present invention, it is possible to acquire HDR images without ghosting.

BEST MODE

Singular forms used in the present specification may include plural forms unless the context clearly indicates otherwise. In the specification, a term such as "composed of" or "include," and the like, should not be construed as necessarily including all of several components or several steps described in the specification, and it should be construed that some component or some steps among them may not be included or additional components or steps may be further included. In addition, the terms "... unit', "module", and the like disclosed in the specification refer to a processing unit of at least one function or operation and this may be implemented by hardware or software or a combination of hardware and software.

Hereinafter, embodiments of the present invention will be described in detail with reference to the accompanying drawings.

Figure 1:
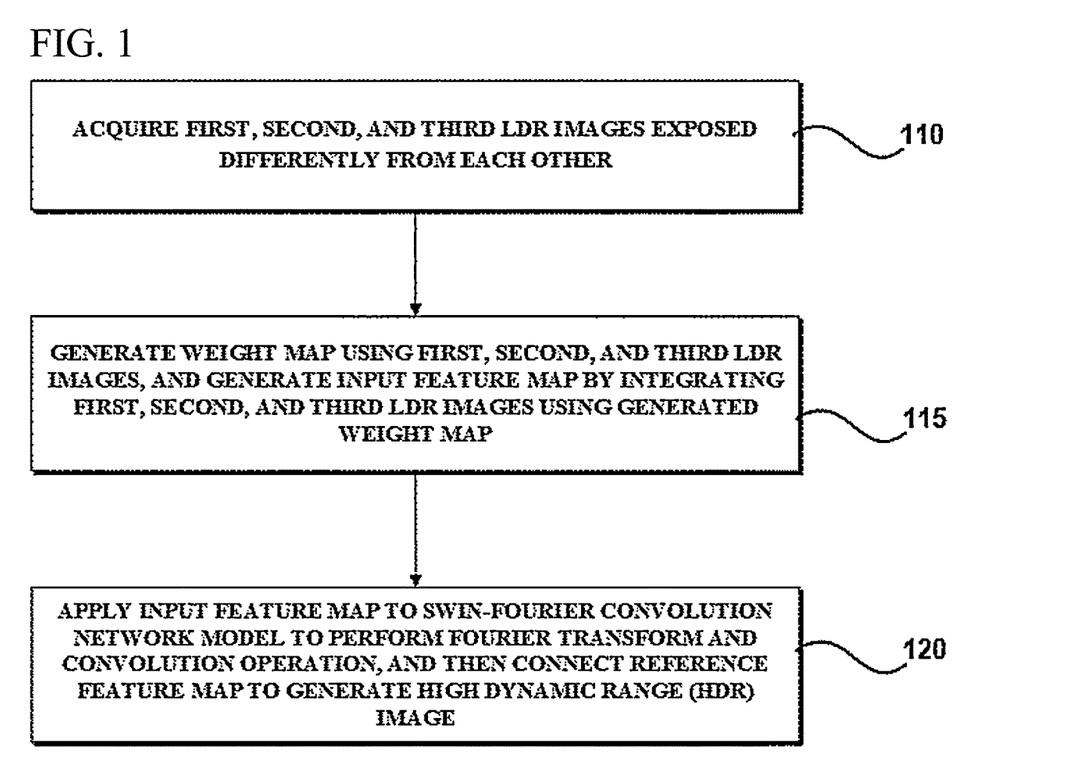
FIG. 1 is a flowchart illustrating a high dynamic range imaging method according to an embodiment of the present invention.
Figure 2:
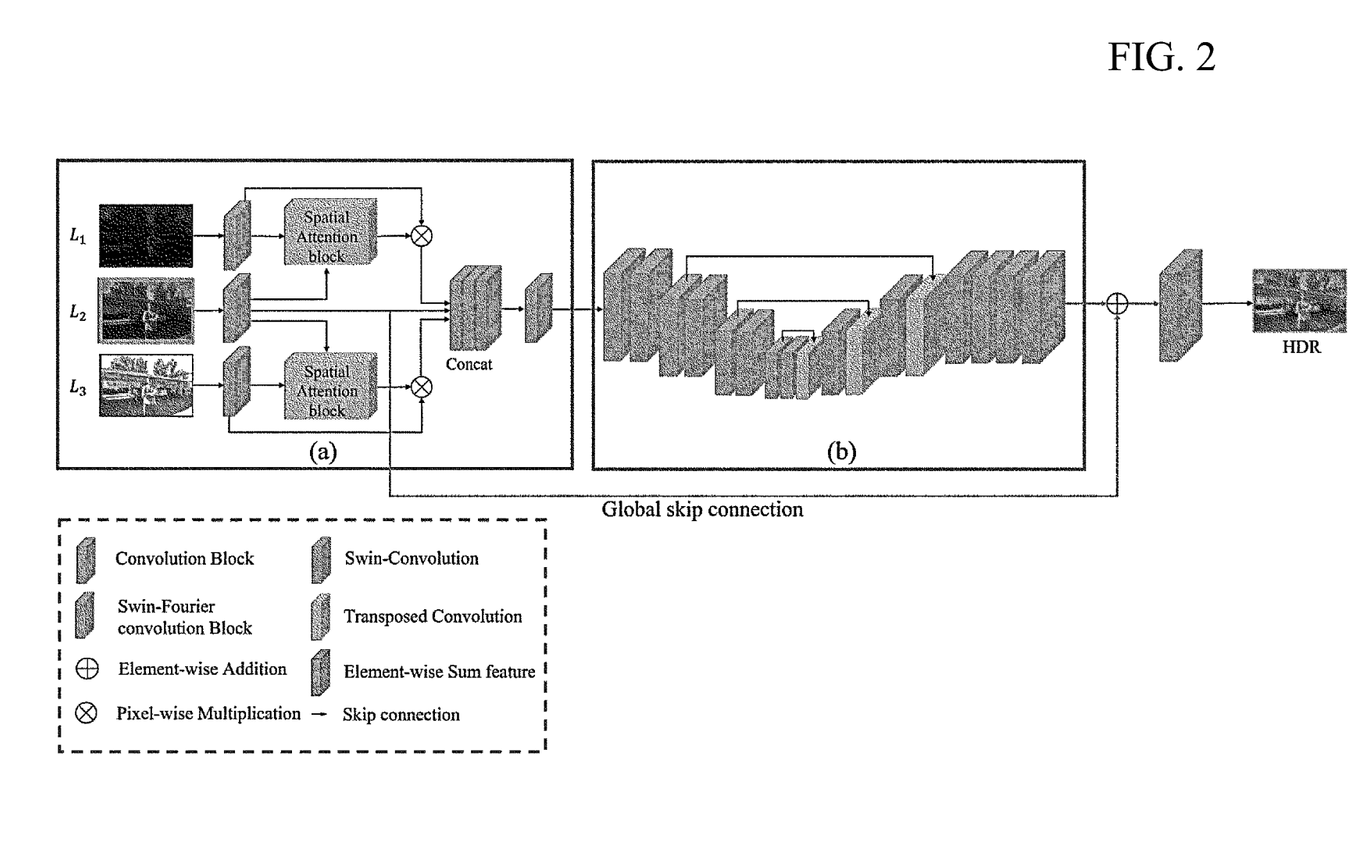
FIG. 2 is a diagram illustrating the network architecture of an HDR imaging apparatus according to an embodiment of the present invention.
Figure 3:
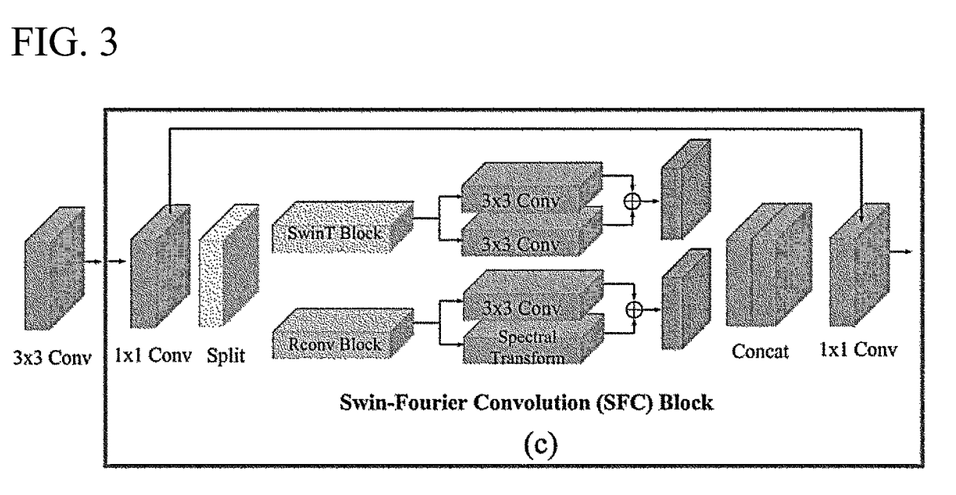
FIG. 3 is a diagram illustrating a structure of a Swin-Fourier convolution model according to an embodiment of the present invention.
Figure 4:
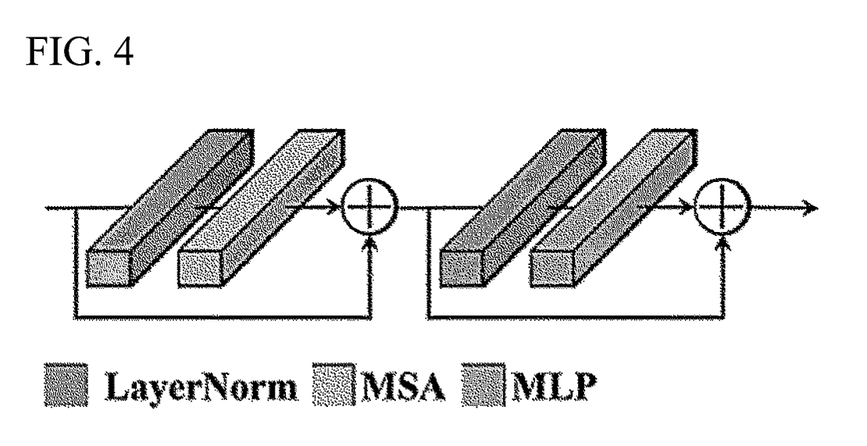
FIG. 4 is a diagram illustrating the structure of a Swin-transformer block according to an embodiment of the present invention.
Figure 5:
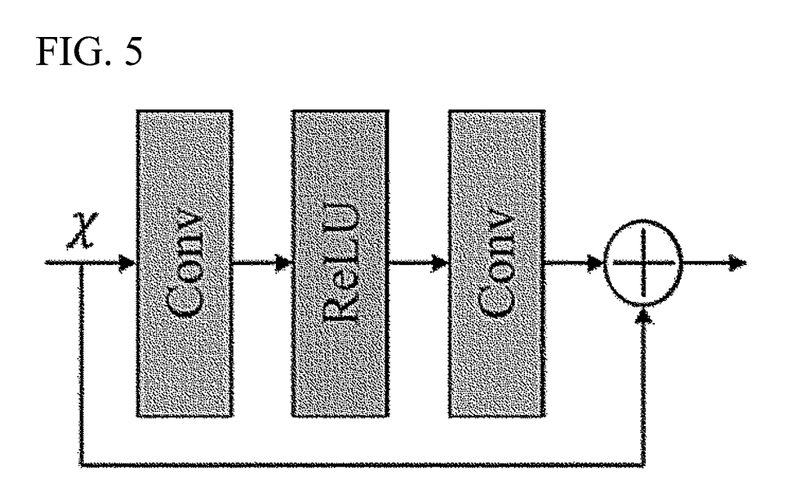
FIG. 5 is a diagram illustrating a structure of a residual block according to an embodiment of the present invention.
Figure 6:
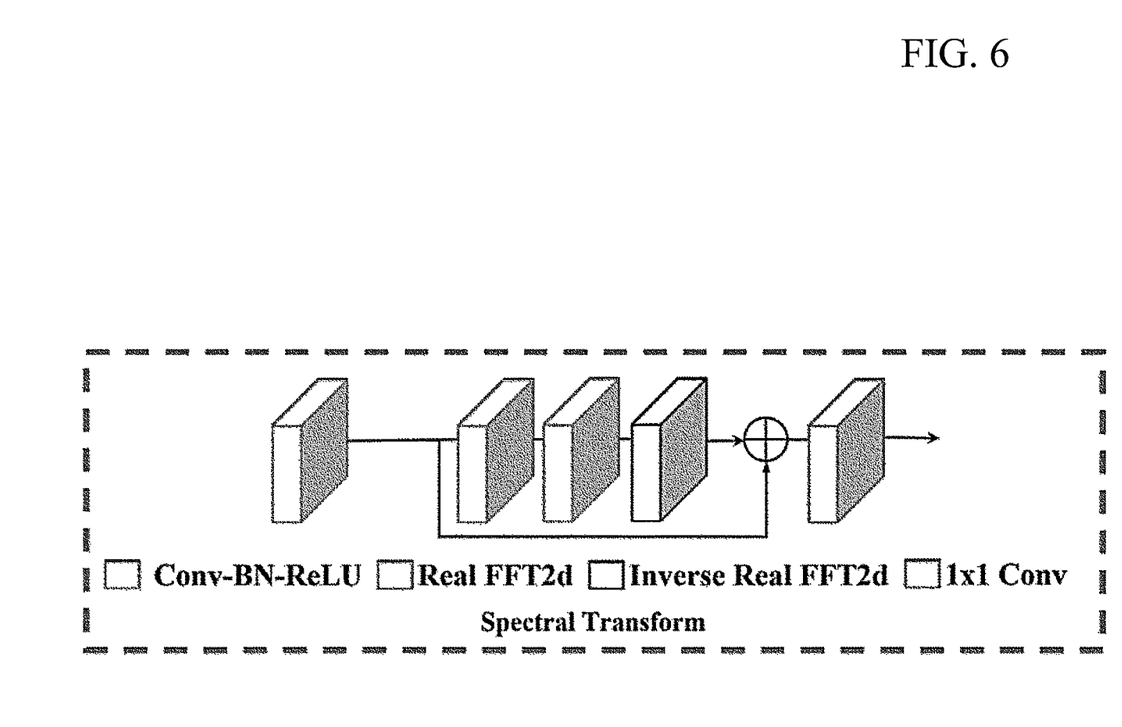
FIG. 6 is a diagram illustrating a structure of a spectral transform block according to an embodiment of the present invention.
Figure 7:
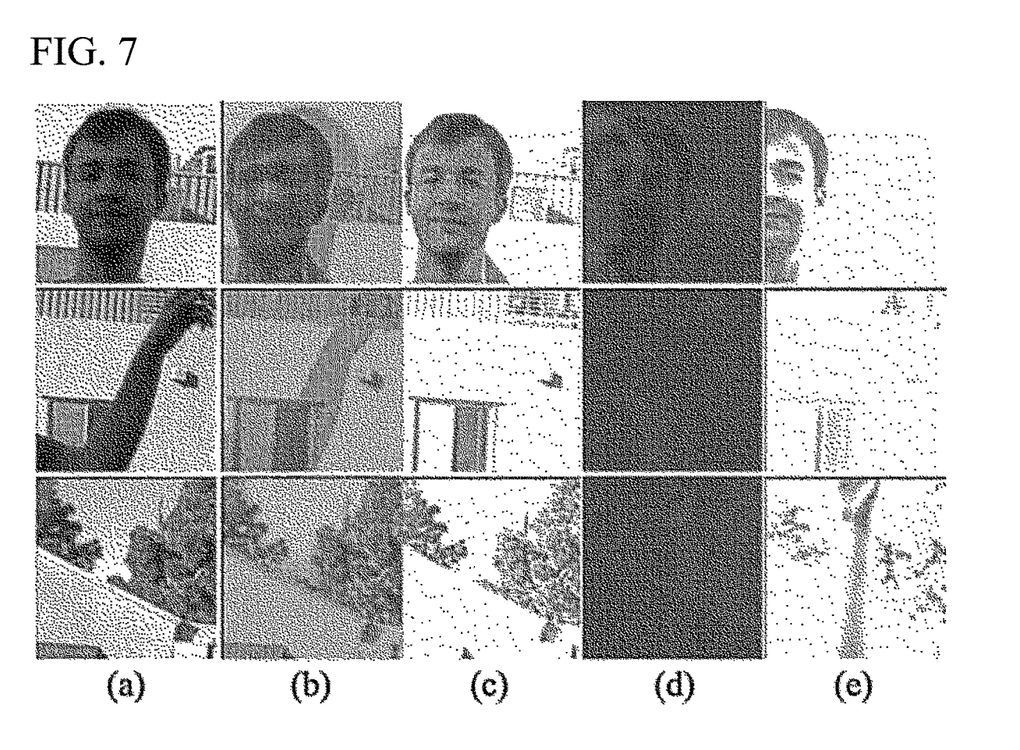
FIG. 7 is a diagram illustrating weight map results according to an embodiment of the present invention.
Figure 8:
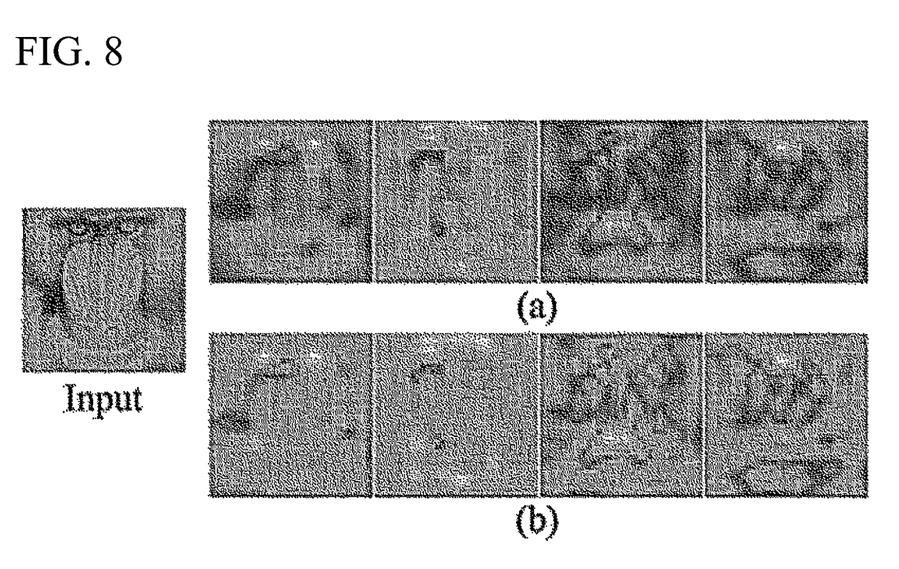
FIG. 8 is a diagram illustrating activation results according to perceptual loss according to the related art and an embodiment of the present invention.

FIG. 1 is a flowchart illustrating a high dynamic range imaging method according to an embodiment of the present invention, FIG. 2 is a diagram illustrating network architecture of an HDR imaging apparatus according to an embodiment of the present invention, FIG. 3 is a diagram illustrating a structure of a Swin-Fourier convolution model according to an embodiment of the present invention, FIG. 4 is a diagram illustrating the structure of a Swin-transformer block according to an embodiment of the present invention, FIG. 5 is a diagram illustrating a structure of a residual block according to an embodiment of the present invention, FIG. 6 is a diagram illustrating a structure of a spectral transform block according to an embodiment of the present invention, FIG. 7 is a diagram illustrating weight map results according to an embodiment of the present invention, and FIG. 8 is a diagram illustrating activation results according to perceptual loss according to the related art and an embodiment of the present invention.

In step 110, an HDR imaging apparatus 100 acquires a plurality of LDR images having different exposure values.

For example, the HDR imaging apparatus 100 may acquire a first LDR image, a second LDR image, and a third LDR image with different exposure values. Here, it is assumed that the first LDR image, the second LDR image, and the third LDR image are sequential images with different exposure values. For convenience, a description will focus on the assumption that an exposure value of the first LDR image is the smallest and the exposure value of the third LDR image is the largest.

For example, to obtain an HDR image, the LDR image input is represented as gi, which means images with different exposures.

An intensity-transformed version of the geometrically aligned image $\hat{L}_i$ mind may be acquired using gamma correction as shown in Equation 1:

$$\hat{L}_i = \frac{L_i^\gamma}{t_i}, \text{ for } i = 1, 2, 3, \qquad \text{[Equation 1]}$$

wherein, $L_i$ denotes an LDR image, $\hat{L}_i$ denotes an HDR image, and γ denotes a gamma parameter which is set to 2.2 in one embodiment of the present invention. $t_i$ denotes an exposure time. $\hat{L}_i$ may be obtained by linearizing a nonlinear LDR input image using a camera response function and applying gamma correction. By defining $L_i$ and $\hat{L}_i$ generated in the preprocessing process as the input image Gi, the HDR image may be acquired as the connected LDR input image. This may be as shown in Equation 2:

$$G_i = \text{Concat}(L_i, \hat{L}_i), \text{ for } i=1,2,3, \qquad \text{[Equation 2]}$$

The overall network model of the high dynamic range imaging apparatus according to an embodiment of the present invention may be defined as Equation 3:

$$\hat{H}=f(A(G_i);\theta).$$ [Equation 3]

wherein, $\hat{H}$ denotes an output (HDR image) of the entire network model, and $\theta$ denotes a learning parameter.

In step 115, the HDR imaging apparatus 100 generates a weight map using the first LDR image, the second LDR image, and the third LDR image, and integrates the first LDR image, the second LDR image, and the third LDR image using the generated weight map to generate the input feature map.

This will be described in more detail with reference to FIG. 2.

The HDR imaging apparatus 100 applies a convolution operation to each of the first LDR image, the second LDR image, and the third LDR image to generate a first feature map, a second feature map, and a third feature map, respectively.

The HDR imaging apparatus 100 applies the first feature map and the second feature map to an attention module to generate the first weight map, and applies the third feature map and the second feature map to the attention module to generate the second feature map. The second feature map may be used as a reference feature map.

This is shown as in Equation 4:

$$F_i^1 = f_i(H_1(G_i), H_1(G_2)), \text{ for } i=1,3,$$ [Equation 4]

wherein, Gi denotes the LDR image, H1 denotes the extracted feature map layer, $f_i$ denotes the attention module, $F_i^1$ denotes the weight map, and the weight map may have a value between [0, 1].

The HDR imaging apparatus 100 may generate an input feature map by reflecting the first weight map and the second weight map in the first feature map and the third feature map, respectively, and then combining the first weight map and second weight map with the reference feature map (second feature map). To minimize the ghosting, the HDR imaging apparatus 100 may generate the input feature map by reflecting the first weight map in the first feature map and the second weight map in the third feature map and then combining the first weight map and second weight map with the reference feature map (second feature map).

That is, the HDR imaging apparatus 100 may reflect the first weight map in the first feature map by performing an element-wise multiplication operation on the first weight map and the first feature map, and reflect the second weight map in the third feature map by performing an element-wise multiplication operation on the second weight map and the third feature map. Next, the HDR imaging apparatus 100 may generate the input feature map by combining the first feature map and the third feature map in which the weight map is reflected with the reference feature map (second feature map).

In this way, as illustrated in FIG. 7, unwanted artifacts may be minimized as the weight is lowered in an area in which ghosting artifacts caused by the movement of objects different from the reference image will occur, which may be the element-wise multiplication of the first weight map ($H_1(G_1)$) and the second weight map ($H_1(G_2)$), and may be expressed as Equation 5:

$$F^2 = C(F_1^1 \times H_1(G_1), H_1(G_2), F_3^1 \times H_1(G_3))$$ [Equation 5]

wherein, $F^2$ denotes the feature map and the connection for each channel, and $C(\cdot)$ denotes an operator that performs the connection after the element-wise multiplication.

To minimize the ghosting, the estimated $F^2$ is used as the input feature map for learning the improved perceptual loss function.

In step 120, the HDR imaging apparatus 100 applies the input feature map to the Swin-Fourier convolution network model, performs Fourier transform and convolution operation, and then connects the reference feature map to generate the HDR image.

As illustrated in FIG. 2, the Swin-Fourier convolution network model is composed of several Swin-Fourier convolution blocks (SCblock), residual blocks (RBs), and transpose convolution blocks (TCblock).

The input feature map may be again composed of the HDR image through a U-shaped network model (i.e., Swin-Fourier convolution network model) composed of the Swin-Fourier convolution block and the transpose convolution block.

The Swin-Fourier convolution block is based on the transformer structure, and is composed of the Swine-transformer block constituting a hierarchical feature map by dividing the feature map into patch units, and the residual block that adds the global residual using the skip connection to the feature map of the reference image.

As illustrated in FIG. 4, the Swin-transformer block may be composed of a layer normalization block, a window-based multi-head self-attention module, a multi-layer perceptron module, and a structure in which 1×1 convolution is performed after the convolution layer.

The Swin-Fourier convolution block may allow feature maps to call a U-shaped encoder module, resulting in lower resolution, perform downsample through a 2×2 stride convolution, and integrate the transformer into the U-shaped network block to use additional hierarchical information. In addition, the residual block is as illustrated in FIG. 5.

In addition, the Swin-Fourier convolution block may further include a connection unit that has a first 3×3 convolution layer and a second 3×3 convolution layer connected to a rear end of the Swin-transformer block, synthesizes output values of the first 3×3 convolution layer and the second 3×3 convolution layer for each element to output a first sub-synthesis result, synthesizes output values of a third 3×3 convolution layer connected to a rear end of the residual block and the residual block with an output value of a spectral transform module that is Fourier transformed for each element to output a second sub-synthesis result, and connects the first sub-synthesis result value and the second sub-synthesis result value.

The transpose convolution block used in the decoder module is composed of the transpose convolution block and the Swin-Fourier convolution block. In order to hierarchically learn the global information, upsampling with 2×2 transpose convolution may increase the resolution.

In addition, according to an embodiment of the present invention, the Swin-Fourier convolution network model may assist learning by adding the feature map of the reference image as the global residual using the skip connection.

The spectral transform block combined with the Swin-Fourier convolution block performs convolution after fast-Fourier transform (FFT), and its structure is as illustrated in FIG. 6. Since the spectral transform block uses the FFT, it is easy to process periodic patterns expressed in images and is used together with the Swin-convolution block to enhance not only the local information but also the global context. The FFT may transform an image signal into a periodic frequency signal, which allows the periodic pattern of the image to be learned.

According to one embodiment of the present invention, the Swin-Fourier convolution network model may add the second feature map for the reference image (i.e., the second LDR image) as the global residual using the global skip connection to perform the residual learning.

The Swin-Fourier convolution network model according to an embodiment of the present invention may be learned using a log perceptual loss function.

This is shown as in Equation 6:

$$L_{EPL} = \frac{1}{N}\sum \exp^{\gamma\||\log|VGG19(T(x))|-\log|VGG19(T(y))|\|} \quad \text{[Equation 6]}$$

wherein, x denotes a target HDR image, y denotes the generated HDR image, $\exp^{-\gamma\|\cdot\|}$ denotes a Gaussian kernel that generalizes a Euclidean distance to a manifold using a geodesic distance, T(·) denotes a tone mapping operator and is calculated as Equation 7:

$$T(M) = \frac{\log(1+\mu M)}{\log(1+M)} \quad \text{[Equation 7]}$$

wherein, denotes a compression parameter.

Accordingly, the total loss function may be represented as Equation 8:

$$L_{total} = L_{EPL} + l_1 \quad \text{[Equation 8]}$$

wherein, $l_1$ denotes an MAE loss, and VGG19( ) denotes pre-trained VGG19 network model.

As illustrated in FIG. 8, by applying the log perceptual loss function according to an embodiment of the present invention, activation may be increased compared to the related art so that an area having a low value have a high value and an area having a high value is maintained high.

Figure 9:
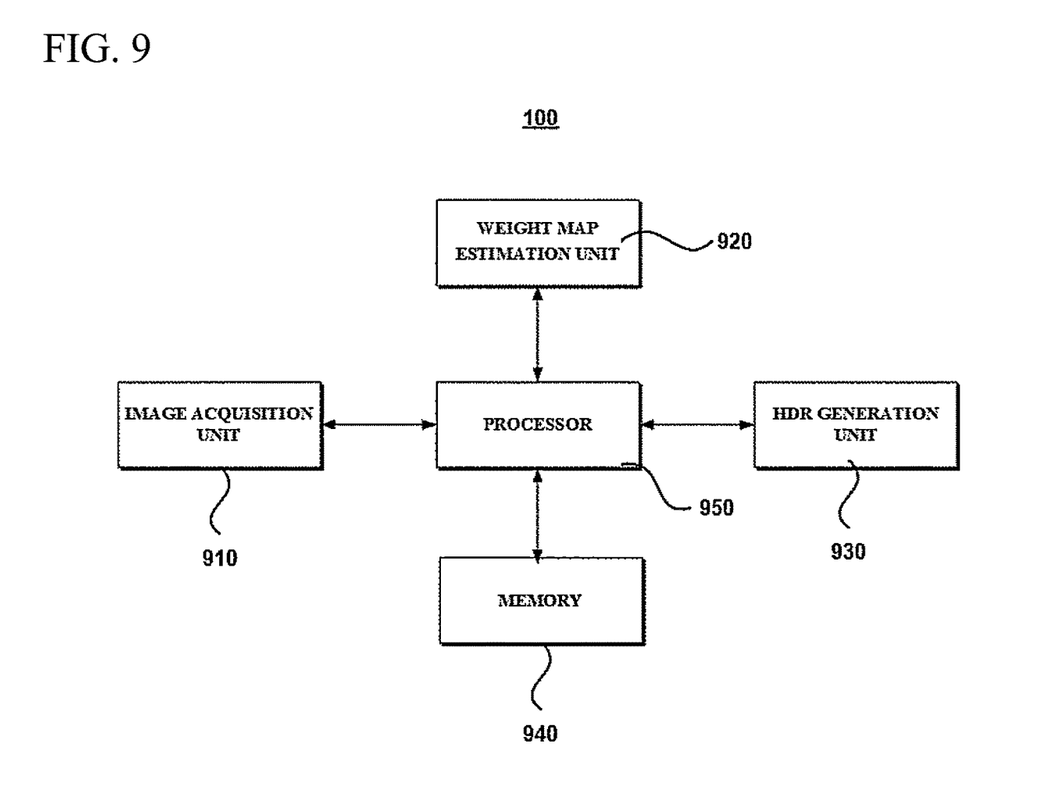
FIG. 9 is a diagram schematically illustrating an internal configuration of an HDR imaging apparatus according to an embodiment of the present invention.

FIG. 9 is a diagram schematically illustrating an internal configuration of an HIDR imaging apparatus according to an embodiment of the present invention.

Referring to FIG. 9, the HDR imaging apparatus 100 according to an embodiment of the present invention includes an image acquisition unit 910, a weight map estimation unit 920, an HDR generation unit 930, a memory 940, and a processor 950.

The image acquisition unit 910 is a means for acquiring a first LDR image, a second LDR image, and a third LDR image having different exposure values.

The weight map estimation unit 920 has a weight map estimation model, and is a means for applying the first, second and third LDR images acquired by the image acquisition unit 910 to the weight map estimation model to extract the weight map, and then generating the input feature map integrating the first, second and third LDR images using the extracted weight map.

For example, the weight map estimation unit 920 applies the first, second, and third LDR images to the convolution layer of the weight map estimation model to extract the first feature map, the second feature map, and the third feature map, respectively. Next, the weight map estimation unit 920 may apply the first feature map and the second feature map to the first attention module of the weight estimation model to generate the first weight map, and apply the third feature map and the second feature map to the second attention module of the weight map estimation model to generate the second weight map. The weight map estimation unit 920 may reflect the first weight map and the second weight map in the first feature map and the third feature map, respectively, and then combine the first weight map and the second weight map with the second feature map to generate an input feature map.

The HDR generation unit 930 is means for applying the input feature map to the Swin-Fourier convolution network model to perform Fourier transform and convolution on the input feature map, and then connecting the reference feature map to generate the HDR image.

The Swin-Fourier convolution network model is the U-shaped network model that is composed of the plurality of Swin-Fourier convolution blocks and the transpose convolution block.

As described above, the Swin-Fourier convolution block may be configured to include: a Swin-transformer block that configures a hierarchical feature map by dividing the input feature map into patch units, a residual block that adds a global residual to a feature map of a reference image using a skip connection, and a connection unit that has a first 3×3 convolution layer and a second 3×3 convolution layer connected to a rear end of the Swin-transformer block, synthesizes output values of the first 3×3 convolution layer and the second 3×3 convolution layer for each element to output a first sub-synthesis result value, synthesizes output values of a third 3×3 convolution layer connected to a rear end of the residual block and an output value of the residual block with an output value of a spectral transform module that is Fourier transformed for each element to output a second sub-synthesis result value, and connects the first sub-synthesis result value and the second sub-synthesis result value.

This Swin-Fourier convolution network model has the advantage of facilitating HDR synthesis by dividing the global area for the input feature map into patch units, performing Fourier transform, and learning using periodic patterns.

In addition, as described above, the U-shaped network model may be learned using the log perceptual loss, thereby increasing an activation to allow areas with low values to have high values and areas with high values to be maintained high.

The memory 940 stores various instructions for performing an HDR imaging method according to an embodiment of the present invention.

A processor 950 is a means to control internal components (e.g., the image acquisition unit 910, the weight map estimation unit 920, and the HDR generation unit 930, the memory 940, etc.) of the HDR imaging apparatus 100 according to an embodiment of the present invention.

The apparatus and the method according to the embodiment of the present invention may be implemented in a form of program commands that may be executed through various computer means and may be recorded in a computer-readable recording medium. The computer-readable recording medium may include a program command, a data file, a data structure, or the like, alone or in a combination thereof. The program commands recorded in the computer-readable recording medium may be especially designed and constituted for the present invention, or may be known to and usable by those skilled in the field of computer software. Examples of the computer-readable recording medium may include magnetic media such as a hard disk, a floppy disk, and a magnetic tape; optical media such as a compact disk read only memory (CD-ROM) or a digital versatile disk (DVD); magneto-optical media such as a floptical disk; and a hardware device specially configured to store and execute program commands, such as a read only memory (ROM), a random-access memory (RAM), a flash memory, or the like.

Examples of the program commands include a high-level language code capable of being executed by a computer using an interpreter, or the like, as well as a machine language code made by a compiler.

The above-mentioned hardware device may be configured to be operated as one or more software modules in order to perform an operation according to the present invention, and vice versa.

Hereinabove, the present invention has been described with reference to exemplary embodiments thereof. It will be understood by those skilled in the art to which the present invention pertains that the present invention may be implemented in a modified form without departing from essential characteristics of the present invention. Therefore, the embodiments disclosed herein should be considered in an illustrative aspect rather than a restrictive aspect. The scope of the present invention should be defined by the claims rather than the above-mentioned description, and all differences within the scope equivalent to the claims should be interpreted to fall within the present invention.

What is claimed is:

1. A high dynamic range imaging method, comprising:
   (a) acquiring a first low dynamic range (LDR) image, a second LDR image, and a third LDR image having different exposure values;
   (b) applying the first, second, and third LDR images to a weight map estimation model to extract a weight map, and integrating the first, second, and third LDR images using the extracted weight map to generate an input feature map; and
   (c) applying the input feature map to a Swin-Fourier convolution network model to perform Fourier transform and convolution on the input feature map, and then connecting a reference feature map to generate a high dynamic range (HDR) image,
   wherein the step (b) comprises:
      applying the first, second, and third LDR images to a convolution layer of the weight map estimation model to extract a first feature map, a second feature map, and a third feature map, respectively;
      applying the first feature map and the second feature map to a first attention module of the weight map estimation model to generate a first weight map, and applying the third feature map and the second feature map to a second attention module of the weight map estimation model to generate a second weight map; and
      generating the input feature map by reflecting the first weight map and the second weight map in the first feature map and the third feature map, respectively, and then combining the first weight map and the second weight map with the second feature map,
   wherein the reference feature map is a feature map of the second LDR image extracted by the weight map estimation model.

2. The high dynamic range imaging method of claim 1, wherein the Swin-Fourier convolution network model is composed of a plurality of Swin-Fourier convolution blocks and a transpose convolution block, wherein the Swin-Fourier convolution block comprises: a Swin-transformer block that configures a hierarchical feature map by dividing the input feature map into patch units; a residual block that adds a global residual to a feature map of a reference image using a skip connection; and a connection unit that has a first 3×3 convolution layer and a second 3×3 convolution layer connected to a rear end of the Swin-transformer block, synthesizes output values of the first 3×3 convolution layer and the second 3×3 convolution layer for each element to output a first sub-synthesis result, synthesizes output values of a third 3×3 convolution layer connected to a rear end of the residual block and a spectral transform module for Fourier transforming the output value of the residual block for each element to output a second sub-synthesis result, and connects the first sub-synthesis result value and the second sub-synthesis result value.

3. The high dynamic range imaging method of claim 1, wherein a loss function of the Swin-Fourier convolution network model is calculated as follows:

$$L_{total}=L_{EPL}+l_1;$$

wherein, $$L_{EPL} = \frac{1}{N}\sum \exp^{\gamma ||log|VGG19(T(x))|-log|VGG19(T(y))|||},$$

x denotes a target HDR image, y denotes the generated HDR image, $\exp^{-\gamma ||\cdot||}$ denotes a Gaussian kernel that generalizes a Euclidean distance to a manifold using a geodesic distance, T(·) denotes a tone mapping operator and is calculated as $$T(M) = \frac{\log(1 + \mu M)}{\log(1 + M)},$$

μ denotes a compression parameter, $l_1$ denotes an MAE loss, and VGG19( ) denotes a convolution neural network.

4. A non-transitory computer-readable recording medium in which a program code for performing the method of claim 1 is recorded.

5. A high dynamic range imaging apparatus, comprising:
   an image acquisition unit configured to acquire a first low dynamic range (LDR) image, a second LDR image, and a third LDR image having different exposure values;
   a weight map estimation unit configured to apply the first, second, and third LDR images to a weight map estimation model to extract a weight map, and integrate the first, second, and third LDR images using the extracted weight map to generate an input feature map; and
   an HDR generation unit configured to apply the input feature map to a Swin-Fourier convolution network model to perform Fourier transform and convolution on the input feature map, and then connect a reference feature map to generate a high dynamic range (HDR) image,
   wherein the weight map estimation unit applies the first, second, and third LDR images to a convolution layer of the weight map estimation model to extract a first feature map, a second feature map, and a third feature map, respectively,
      applies the first feature map and the second feature map to a first attention module of the weight map estimation model to generate a first weight map, and applies the third feature map and the second feature map to a second attention module of the weight map estimation model to generate a second weight map, and
      generates the input feature map by reflecting the first weight map and the second weight map in the first feature map and the third feature map, respectively, and then combining the first weight map and the second weight map with the second feature map, wherein the reference feature map is a feature map of the second LDR image extracted by the weight map estimation model.

6. The high dynamic range imaging apparatus of claim 5, wherein the Swin-Fourier convolution network model is composed of a plurality of Swin-Fourier convolution blocks and a transpose convolution block, wherein the Swin-Fourier convolution block comprises: a Swin-transformer block that configures a hierarchical feature map by dividing the input feature map into patch units; a residual block that adds a global residual to a feature map of a reference image using a skip connection; and a connection unit that has a first 3×3 convolution layer and a second 3×3 convolution layer connected to a rear end of the Swin-transformer block, synthesizes output values of the first 3×3 convolution layer and the second 3×3 convolution layer for each element to output a first sub-synthesis result, synthesizes output values of a third 3×3 convolution layer connected to a rear end of the residual block and a spectral transform module for Fourier transforming the output value of the residual block for each element to output a second sub-synthesis result, and connects the first sub-synthesis result value and the second sub-synthesis result value.

* * * * *